(12) United States Patent
Wang

(10) Patent No.: US 6,767,094 B2
(45) Date of Patent: Jul. 27, 2004

(54) AUXILIARY LENS MODULE

(76) Inventor: Jeff Wang, 7F-2, No. 70, Yen Ping S. Rd., Taipei (TW)

(*) Notice: Subject to any disclaimer, the term of this patent is extended or adjusted under 35 U.S.C. 154(b) by 0 days.

(21) Appl. No.: 10/211,328

(22) Filed: Aug. 5, 2002

(65) Prior Publication Data

US 2004/0021823 A1 Feb. 5, 2004

(51) Int. Cl.⁷ .................................................. G02C 7/08
(52) U.S. Cl. ............................................. 351/57; 351/47
(58) Field of Search ............................ 351/47, 48, 57, 351/58, 110, 41; D16/900

(56) References Cited

U.S. PATENT DOCUMENTS

| | | | |
|---|---|---|---|
| 6,354,703 B1 * | 3/2002 | Sadler | 351/57 |
| 2001/0009450 A1 * | 7/2001 | Da Via | 351/57 |

* cited by examiner

*Primary Examiner*—Huy Mai
(74) *Attorney, Agent, or Firm*—Browdy and Neimark, P.L.L.C.

(57) ABSTRACT

An auxiliary lens module includes a magnetic holder and a magnetic attaching arrangement that are fastened with each other by magnetic attraction, and an auxiliary lens fixedly fastened with the magnetic attaching arrangement. A first chamer is formed in an upper portion of a holder body of the magnetic holder to receive a first magnet. A second chamer is formed in a lower portion of the holder body to receive a second magnet. The magnetic attaching arrangement includes a L-shaped attaching body that has a long arm located upon the magnetic holder and a short arm located behind the magnetic holder. The long arm is provided with a third chamer that receives a third magnet. The short arm is provided with a fourth chamer that receives a fourth magnet. The long arm extends in a side tongue with which is fixedly fastened the auxiliary lens.

6 Claims, 6 Drawing Sheets

AUXILIARY LENS MODULE

BACKGROUND OF THE INVENTION

1. Field of the Invention

The invention relates to an auxiliary lens module, more specifically, an auxiliary lens module which can be separately attached on a spectacle frame.

2. Description of the Related Art

It is convenient for a near-sighted user to wear both near-sight glasses and sunglasses in a same spectacle set. A conventional spectacle set of this type usually includes a spectacle frame, near-sight lenses and sunglasses hung on the spectacle frame. The sunglasses are fixedly connected to each other via a bridge. When one of the sunglasses is damaged, the two sunglasses have to be entirely replaced. Furthermore, the bridge of the sunglasses easily hurts the user's noise and inadvertently the user's eyes when the user removes the spectacle set. Moreover, the sunglasses are usually mounted on a metallic frame, which increases the weight of the spectacle set.

FIG. 1 shows a conventional spectacle frame to which are attached sunglasses. A primary bridge of a conventional spectacle 11 is provided with at least one magnetic element 13. Auxiliary lenses 14 are further connected by a magnetic element 16 to form an auxiliary lens set. The auxiliary lens set is detachably connected with the spectacle 11 by magnetic attraction between the magnetic element 13 and the magnetic element 16. When one of the auxiliary lenses 14 is damaged, the auxiliary lens set must be entirely replaced.

SUMMARY OF INVENTION

It is therefore one object of the invention to provide an auxiliary lens module that can be separately attached to a spectacle frame. The auxiliary lens module of the invention has a magnetic attaching arrangement, a magnetic holder and an auxiliary lens. The magnetic holder is mounted on a frame hinge of the spectacle frame. The magnetic attaching arrangement is fastened onto the auxiliary lens. The auxiliary lens is secured on the spectacle frame by magnetic attraction between the magnetic attaching arrangement and the magnetic holder. Since the auxiliary lens module is separately attached to the spectacle frame, it can be separately replaced.

It is another object of the invention to provide an auxiliary lens module in which the magnetic holder is integrally formed with the spectacle frame. Therefore, the magnetic attaching arrangement is detachably connected with the magnetic holder. The auxiliary lens can be a convex lens, concave lens or astigmatistic lens.

In order to achieve the above and other objectives, the invention provides an auxiliary lens module that can be fixed on a spectacle frame having a frame body, two side extensions and two frame hinges respectively connecting the frame body and the side extensions. The auxiliary lens module comprises a magnetic holder, a magnetic attaching arrangement, and an auxiliary lens. The magnetic holder includes a holder body. A first chamber is formed in an upper portion of the holder body for receiving a first magnet. A second chamber is formed in a lower portion of the holder body for receiving a second magnet. An extension portion extends from the holder body and has a screw hole therein. A screw engages through the screw hole of the magnetic holder to fasten the magnetic holder with the frame hinge. The magnetic attaching arrangement includes a L-shaped attaching body that has a long arm located upon the magnetic holder and a short arm located behind the magnetic holder. The long arm is provided with a third chamber that receives a third magnet. The short arm is provided with a fourth chamber that receives a fourth magnet. A side tongue is formed perpendicular to the lone arm of the L-shaped body. The side tongue is attached on a surface of the auxiliary lens so that the auxiliary lens is located in front of or behind the spectacle frame.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 2A is a partially enlarged view of part A of FIG. 2;

DETAILED DESCRIPTION OF THE EMBODIMENTS

Figure 1:
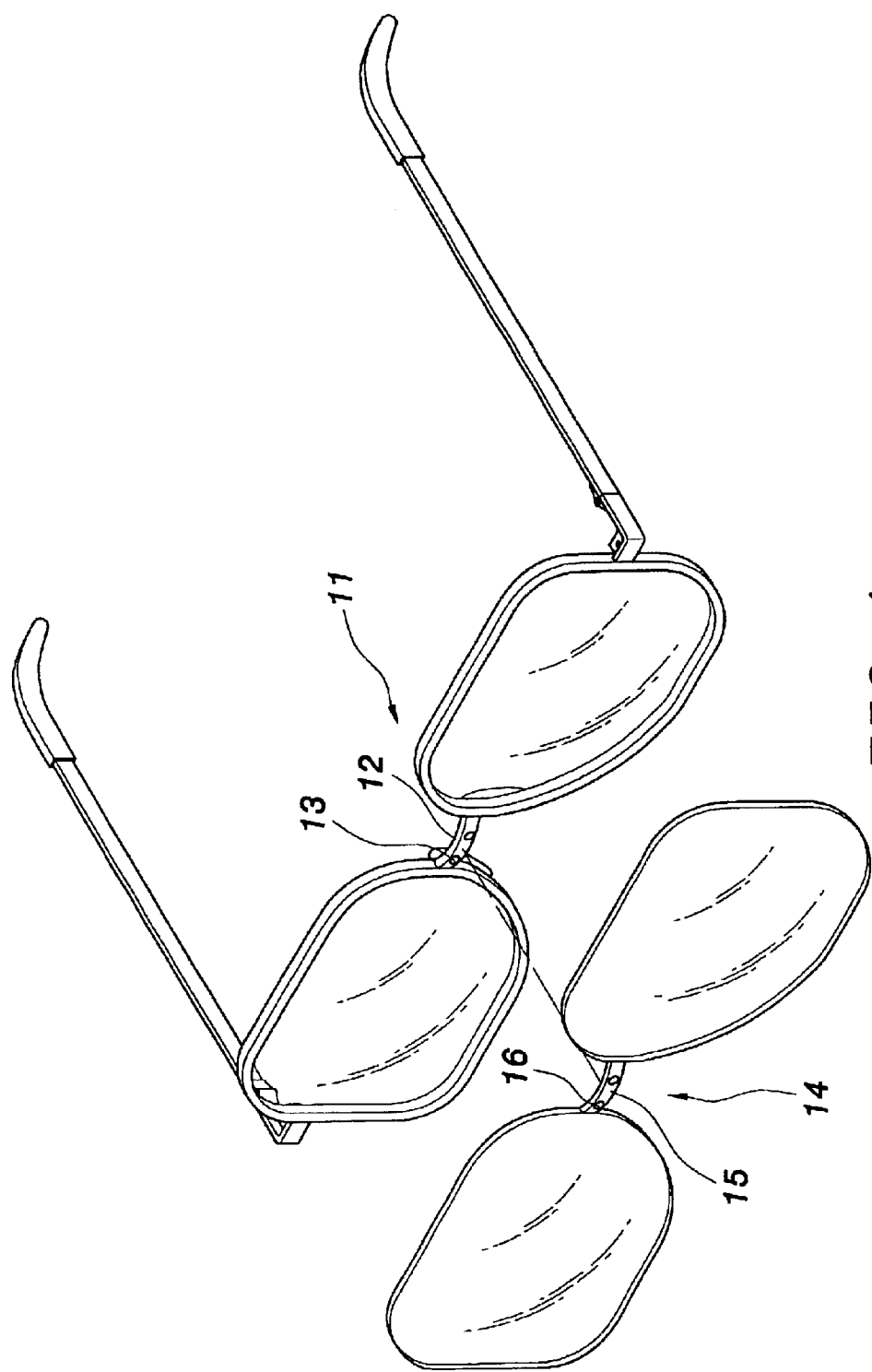
FIG. 1 is a schematic exploded view of the assembly of a conventional spectacle frame with a conventional auxiliary lens set.
Figure 2:
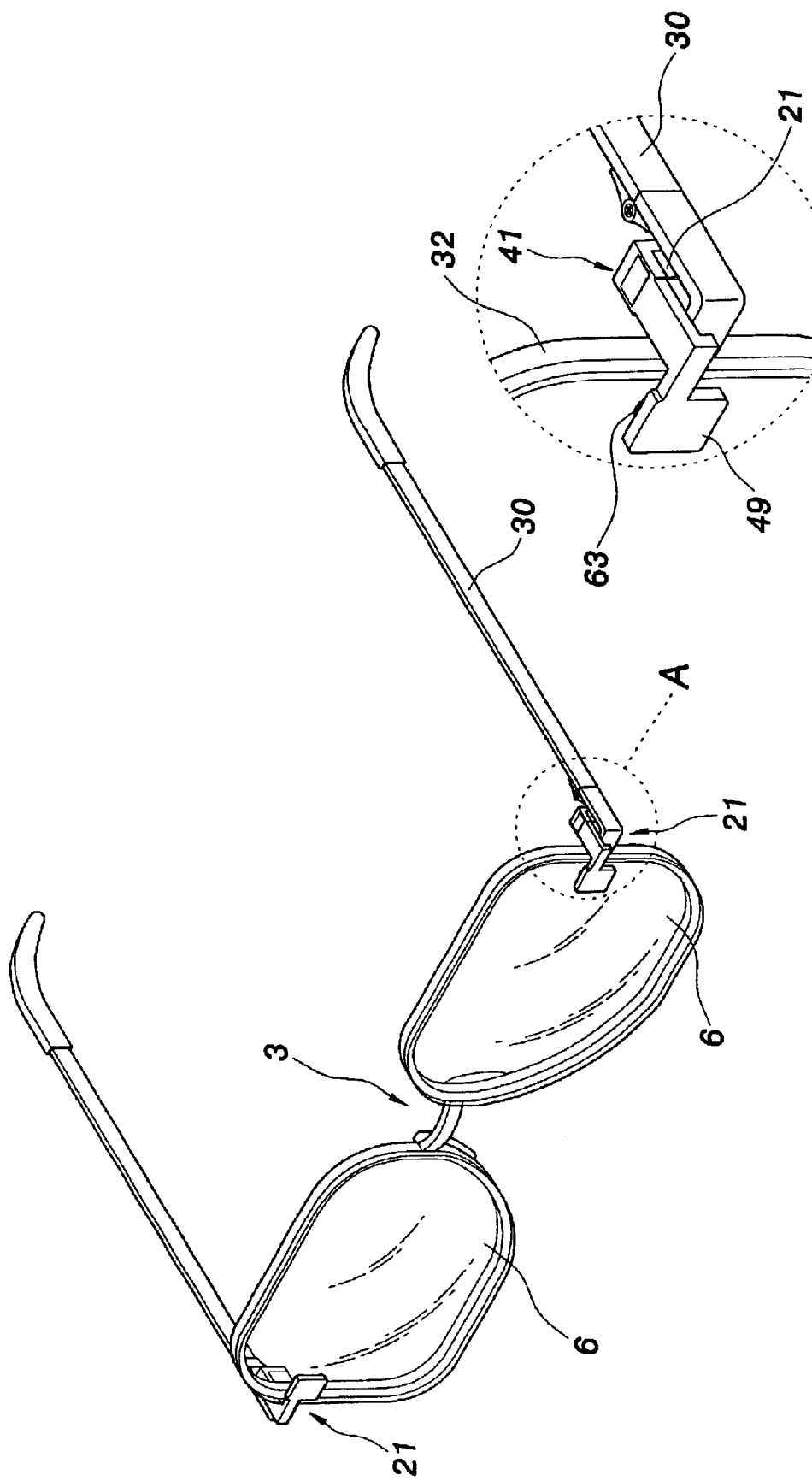
FIG. 2 is a perspective view of an auxiliary lens module according to one embodiment of the invention.
Figure 3:
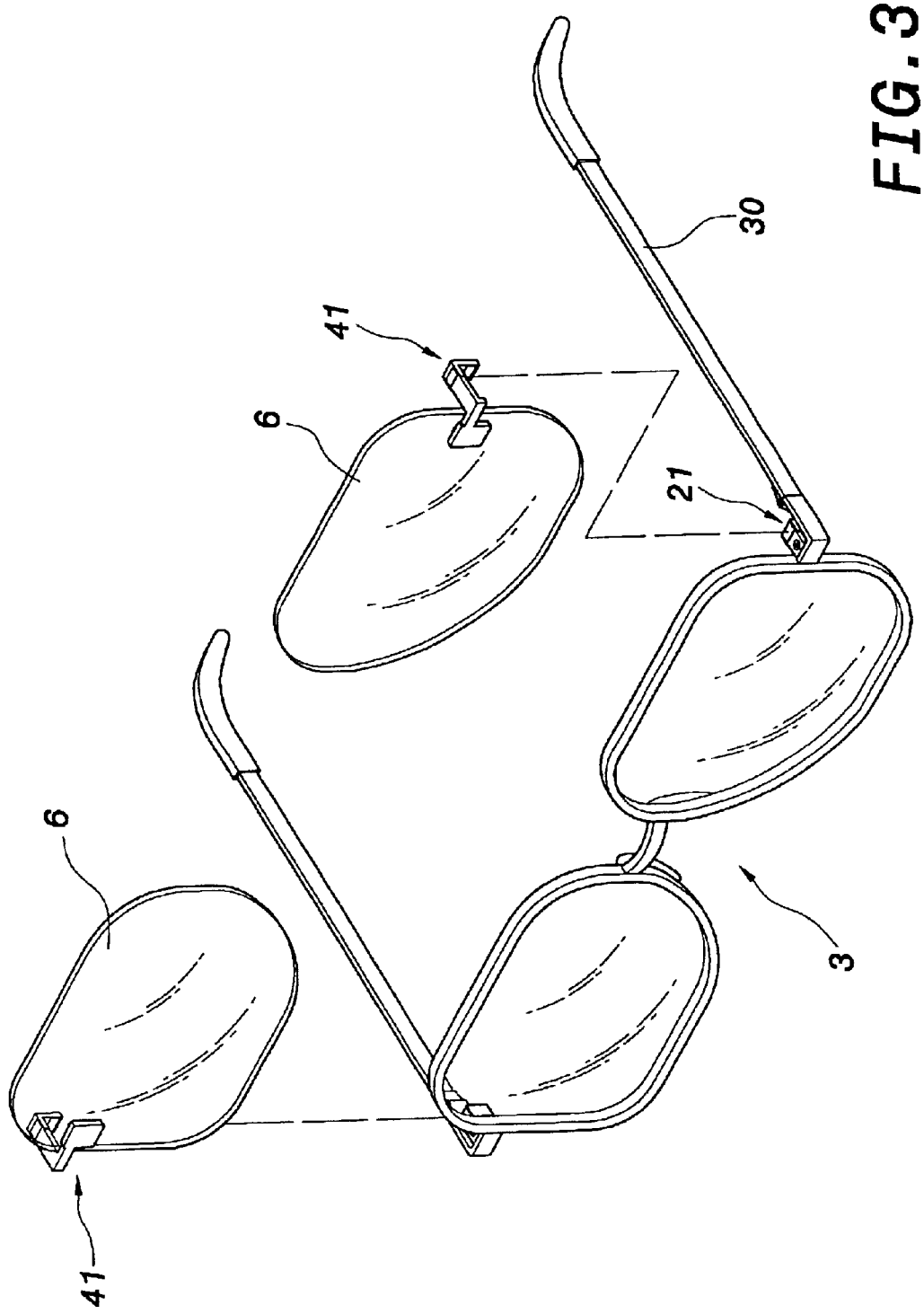
FIG. 3 shows a magnetic holder and a magnetic attaching arrangement of the auxiliary lens module according to one embodiment of the invention.
Figure 4:
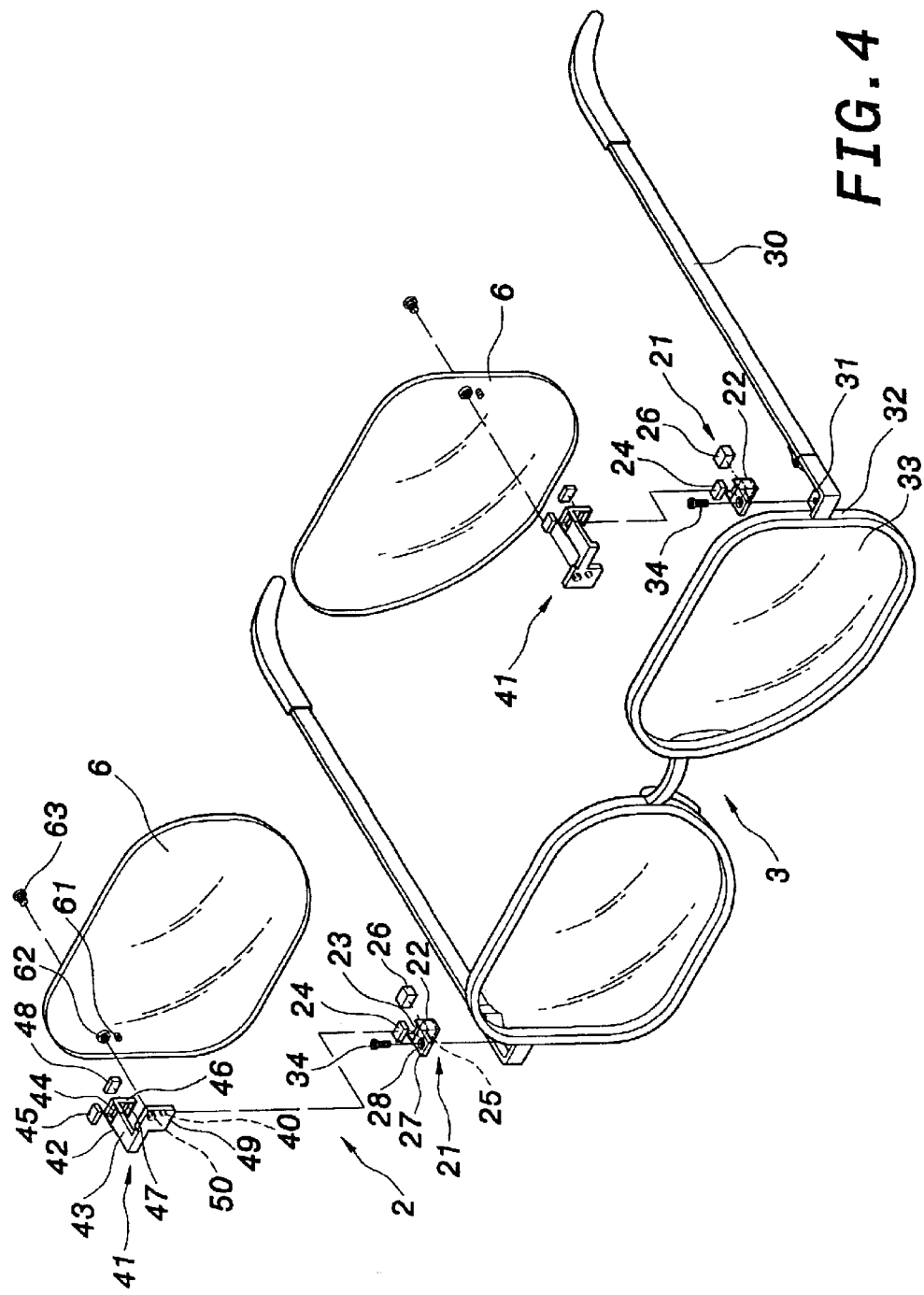
FIG. 4 is an exploded view of the auxiliary lens module according to one embodiment of the invention.
Figure 5:
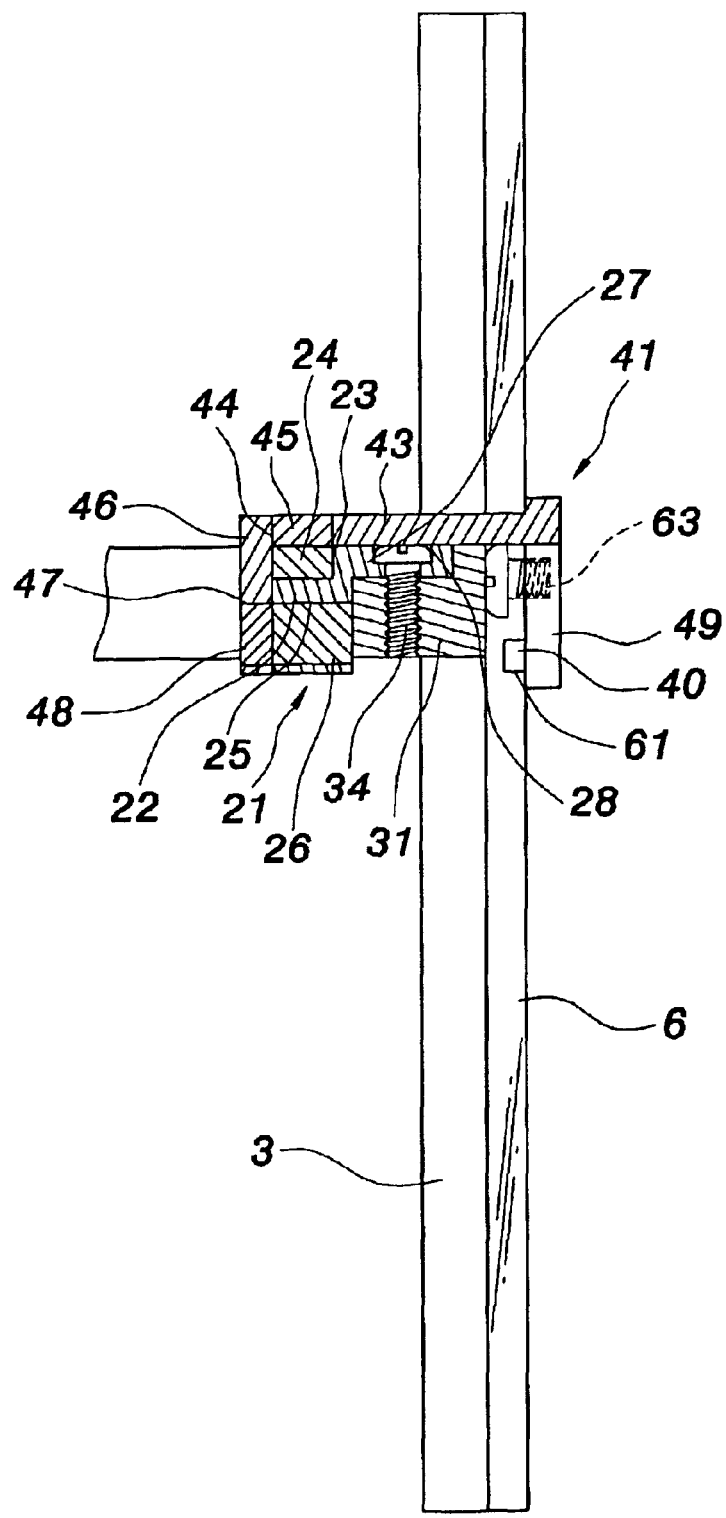
FIG. 5 is a cross-sectional view of the auxiliary lens module according to one embodiment of the invention.

Wherever possible in the following description, like reference numerals will refer to like elements and parts unless otherwise illustrated.

FIG. 2 through FIG. 5 show a spectacle set according to one embodiment of the invention. The spectacle set includes an auxiliary lens module 2 and a spectacle frame 3. The spectacle frame 3 includes a frame body 32 and a pair of side extensions 30. The frame body 32 is connected to the pair of side extensions 30 through frame hinges 31 respectively having a L-shape. To the frame body 32 are mounted a pair of primary lenses 33.

Figure 6:
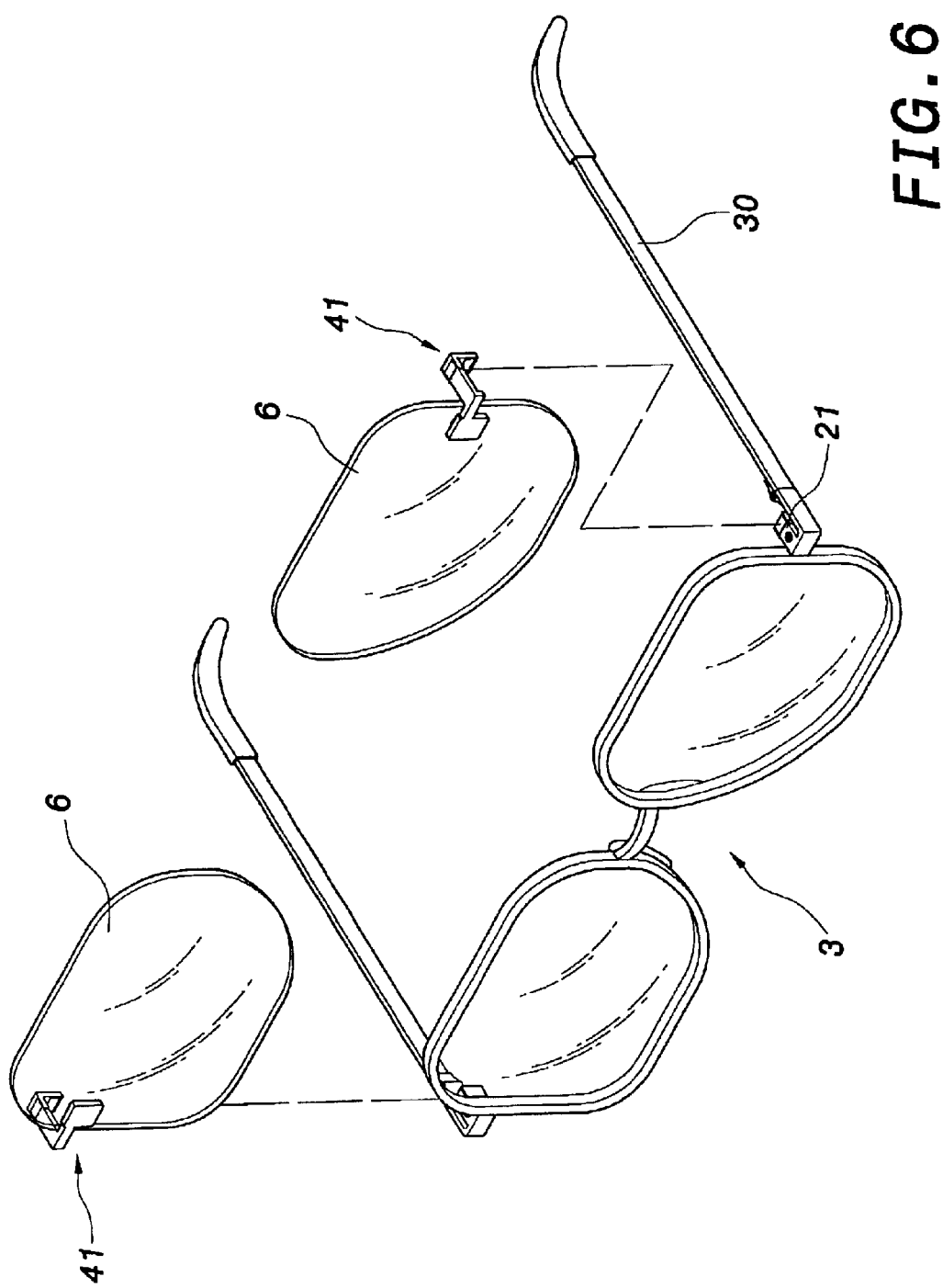
FIG. 6 is an exploded view of an auxiliary lens module in which a magnetic holder of the auxiliary lens module is integrally formed with a frame hinge of a spectacle frame according to another embodiment of the invention.

The auxiliary lens module 2 includes an auxiliary lens 6, a magnetic holder 21 and a magnetic attaching arrangement 41. The magnetic holder 21 has a holder body 22. A first chamber 23 is formed in an upper portion of the holder body 22 for receiving a first magnet 24. A second chamber 25 is formed in a lower portion of the holder body 22 for receiving a second magnet 26. An extension portion 27 extends from the holder body 22 and has a screw hole 28. A screw 34 engages through the screw hole 28 to fasten the magnetic holder 21 with the frame hinge 31. In an embodiment of the invention shown in FIG. 6, the holder body 22 of the magnetic holder 21 is integrally formed with the frame hinge 31. Once the auxiliary lens 6 needs to be replaced, a user only has to purchase the magnetic attaching arrangement 41 and the auxiliary lens 6 without the magnetic holder 21.

The magnetic attaching arrangement 41 has a L-shaped attaching body 42. The L-shaped attaching body 42 has a long arm 43 and a short arm 46. The long arm 43 is located upon the magnetic holder 21, and is provided with a third chamber 44 that receives a third magnet 45. The short arm 46 is located behind the magnetic holder 21, and is provided with a fourth chamber 47 that receives a fourth magnet 48. A side tongue 49 is perpendicular to the long arm 43. The side tongue 49 is attached onto a surface of the auxiliary lens 6, in a manner that the auxiliary lens 6 is located either in front of or behind the primary lens 33. The side tongue 49 has a protrusion 40 and a screw hole 50. The auxiliary lens 6 has a slot 61 and a though hole 62. A screw 63 passes though the through hole 62 from a rear surface of the auxiliary lens 6 to engage the screw hole 50 of the side tongue 49, so that the protrusion 40 of the side tongue 49 engages the slot 61 of the auxiliary lens 6.

Each auxiliary lens 6 is clamped by means of the pairs of magnets 24, 26, 45, 48. The first magnet 24 partially extends over the holder body 22 to attach to the third magnet 45 by magnetic attraction. The second magnet 26 partially extends over the holder body 22 to attach to the fourth magnet 48 by magnetic attraction. Furthermore, the third magnet 45 and the fourth magnet 48 also partially extend over the attaching body 42 for magnetically connection.

In the invention, the magnetic holder 21 is mounted at the frame hinge. Each auxiliary lens 6 is placed in position by the attachment of the magnetic attaching arrangement 41 onto the magnetic holder 21. The auxiliary lens 6 can be located behind or in front of the primary lens 33 according to the user's desire. The auxiliary lens 6 can be larger or smaller than the primary lens 33. Preferably, the auxiliary lenses 6 are sunglasses. The user can separately replace each of the sunglasses. Furthermore, the size of the auxiliary lenses is not limited by the spectacle frame.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An auxiliary lens module, comprising:

a magnetic holder, including:
        a holder body having a first chamber at an upper portion thereof and a second chamber at a lower portion thereof;
        a first magnetic member received in the first chamber;
        a second magnetic member received in the second chamber, and
        an extension portion, extending from the holder body and having a screw hole;
    a magnetic attaching arrangement, including:
        a L-shaped attaching body, having a long arm located upon the magnetic holder and a short arm located behind the magnetic holder, wherein the long arm has a third chamber and a third magnetic member received in the third chamber, and the short arm has a fourth chamber and a fourth magnetic member received in the fourth chamber, and
        a side tongue, perpendicular to the long arm of the L-shaped body; and
    an auxiliary lens, wherein the side tongue is attached onto a surface of the auxiliary lens.

2. The module of claim 1, wherein the side tongue has a protrusion and a screw hole, and the auxiliary lens has a slot and a though hole, and a screw passes though the through hole to engage the screw hole of the side tongue, so that the protrusion of the side tongue engages through the slot of the auxiliary lens.

3. The module of claim 1, wherein the auxiliary lens attached onto the side tongue is adapted to be located in front of a spectacle frame.

4. The module of claim 1, wherein the holder body of the magnetic holder is integrally formed with a frame hinge.

5. The module of claim 1, further comprising a screw that engages the screw hole of the magnetic holder for fastening the magnetic holder with a frame hinge.

6. The module of claim 1, wherein a frame hinge is attached with one auxiliary lens module.

* * * * *